United States Patent [19]

Shimauchi et al.

[11] 4,041,783
[45] Aug. 16, 1977

[54] SYSTEM FOR MEASURING VIBRATION FREQUENCY OF VIBRATING OBJECT

[75] Inventors: Minoru Shimauchi, Hamamatsu; Takashi Onoda, Hamakita, both of Japan

[73] Assignee: Nippon Gakki Seizo Kabushiki Kaisha, Hamamatsu, Japan

[21] Appl. No.: 662,687

[22] Filed: Mar. 1, 1976

[30] Foreign Application Priority Data

Mar. 5, 1975 Japan .................................. 50-25885
Apr. 22, 1975 Japan .................................. 50-58146

[51] Int. Cl.$^2$ ...................... G01H 13/00; G10G 7/02
[52] U.S. Cl. ...................................... 73/552; 73/67.2; 84/454
[58] Field of Search ............... 73/552, 559, 67.1, 67.2, 73/67.3, 67.4, 67.8 R, 71.4, DIG. 1; 324/77 B, 77 E; 84/454

[56] References Cited

U.S. PATENT DOCUMENTS

| | | | |
|---|---|---|---|
| 2,393,225 | 1/1946 | Andalikiewicz | 73/67.2 |
| 2,522,924 | 9/1950 | Branson | 73/67.8 |
| 3,896,697 | 7/1975 | Iannone | 84/454 |

*Primary Examiner*—Richard C. Queisser
*Assistant Examiner*—John P. Beauchamp
*Attorney, Agent, or Firm*—Cushman, Darby & Cushman

[57] ABSTRACT

A system for measuring the vibration frequency of a vibrating object useful for the adjustment of the vibration frequency of a piano string or like vibrating objects. In this system, the vibration of the vibrating object is converted to an electric signal, based on which signal is sought the difference between the vibration frequencies of any two adjacent harmonics of the vibrating object, i.e. the fundamental vibration frequency of the vibrating object is sought. The electric signal is led to a counter via a voltage-controlled variable band-pass filter. The middle frequency of the pass-band of this filter is controlled by a sweeper and varies continuously. For each agreement of this middle frequency of the pass-band with any one of the harmonics, the output of the filter presents a peak. The frequency corresponding to each peak is detected by a counter. The fundamental frequency is calculated from the difference between frequencies corresponding to any adjacent peaks of the outputs of the filter.

In another aspect of the system, the electric signal of vibration discussed above is inputted respectively, to a pair of band-pass filters whose respective middle frequencies are selected so as to agree with the frequencies of any adjacent two harmonics, and the outputs are multiplied by a multiplier. From the multiplied signal is derived, through a low-pass filter, a lower frequency component which now has the aimed fundamental vibration frequency.

6 Claims, 5 Drawing Figures

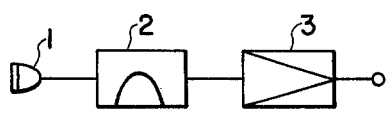
FIG. 1
FIG. 2
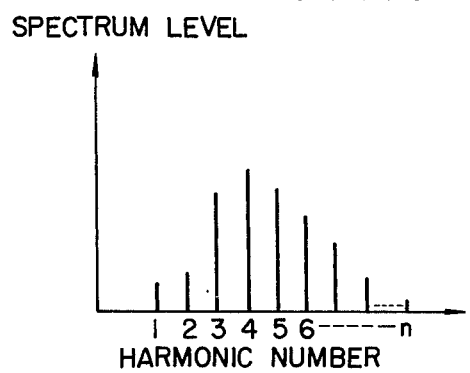
FIG. 3
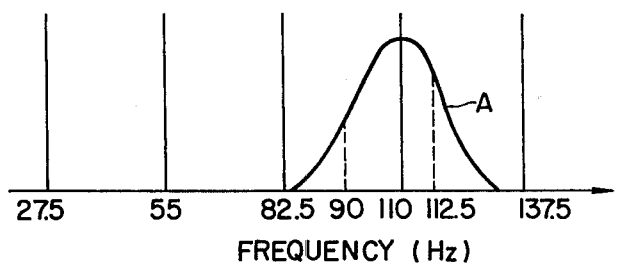
FIG. 4
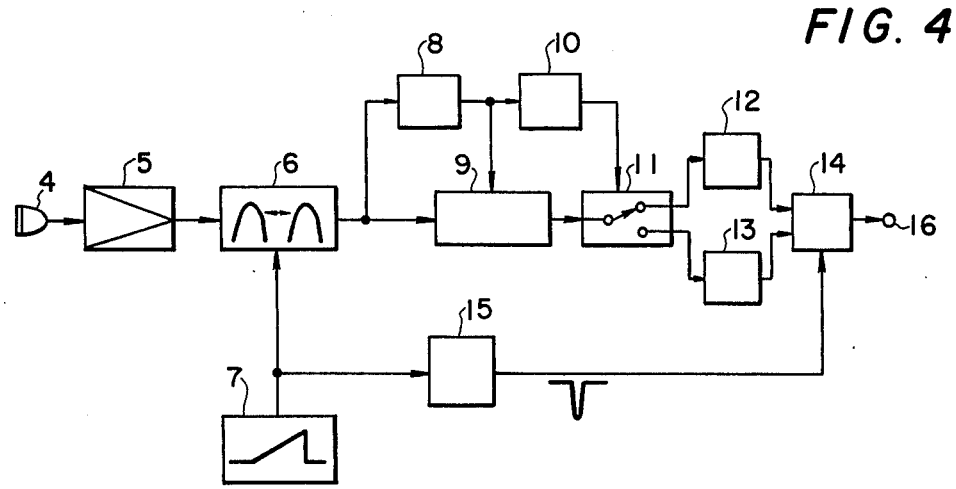
FIG. 5
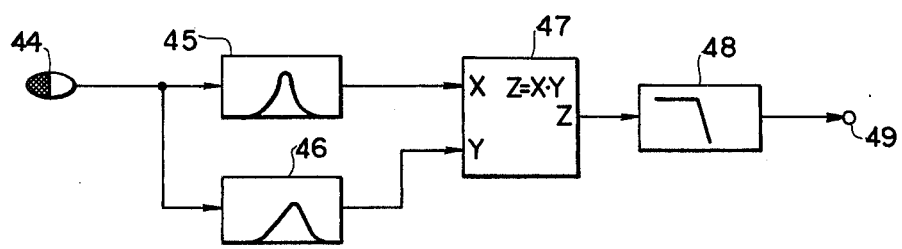

SYSTEM FOR MEASURING VIBRATION FREQUENCY OF VIBRATING OBJECT

BACKGROUND OF THE INVENTION a. Field of the Invention

The present invention relates to a system for measuring the vibration frequency of a vibrating object, and in particular it pertains to a method for measuring the vibration frequency of a vibrating object, such as a string of a piano, which develops harmonic vibrations, and also it concerns a method for adjusting the vibration frequency of the vibrating object.

b. Description of the Prior Art

A number of vibrating objects (strings) are used in a musical instrument such as a piano. By causing vibration of such vibrating object, there has been obtained the production of a sound having a frequency corresponding to the fundamental frequency of the vibrating object. In such a case, the vibration frequency of the vibrating object tends to undergo a side variation depending on the factors such as the trifle dimensional errors arising at the time of the manufacture of the vibrating object, the unevenness of the quality of the material with which the vibrating object is made, and the conditions in which the vibrating object is assembled into a musical instrument. Accordingly, in a musical instrument wherein a precision vibration frequency is required, there is carried out adjustment of the vibration frequency of the vibrating object upon completion of the assemblage of the whole musical instrument, and also periodically thereafter. In conducting such adjustment of the vibration frequency of the vibrating object, there has been employed in the past a tuning method which entirely depends on the acoustic sense of a well-trained tuning expert. Recently, however, there is relied upon the method consisting of an electrical detection of the vibration frequency of the vibrating object and then of carrying out the tuning in such a way that the detected value is adjusted so as to agree with a reference value. This latter method will hereunder be described in further detail by referring to FIG. 1. By the use of a sensor 1 such as a microphone, the vibration frequency of a vibrating object not shown is converted to an electric signal. This electric signal is derived via a band-pass filter 2 having a middle point of a pass band set at the frequency to which the vibration frequency of the vibrating object is to be tuned in and also via an amplifier 3. The tuning operation is carried out by a tuner by adjusting, for example, the tuning pin of a piano in such a way that the output of the amplifier 3 will present a peak level of amplitude.

It should be noted that such a vibrating object as the strings of a piano involves harmonic vibrations in addition to the fundamental vibration frequency. Accordingly, the output electric signal derived from the sensor 1 contains a fundamental frequency component f and its harmonic components nf (n=2, 3, ...). In such a vibrating object such as the string of a piano, it should be noted that, in case its fundamental vibration frequency is low (meaning it is in the bass region), the spectrum of the harmonics is as shown in FIG. 2. That is, the amplitude level of the harmonic component is high as distinctly contrasted by an extremely low amplitude level of the fundamental frequency component. Moreover, the microphone assigned to detect the vibration of the vibrating object generally presents a poor sensitivity to the lower frequencies, and besides, there also arise problems such as noises. As such, in conducting the tuning of a piano string of the lower pitch range, it is difficult to carry out a direct detection of the fundamental vibration frequency component. The tuning of such a string requires to be done by detecting the harmonic components. In case it is intended to tune the fundamental vibration frequency into for example 27.5 Hz, there has been employed a band-pass filter whose middle point of the band is set at 110 Hz which is the frequency of the quadruple harmonic, to carry out the tunning in such a way that the output of this band-pass filter will present a peak level. However, in the low pitch range of sound, the difference in frequency between the respective adjacent harmonic sounds is small and moreover, there is a limit in the improvement of the selectively of filters. Therefore, any two adjacent harmonic signal components undesirably jointly pass through the band-pass filter 2. Thus, it becomes impossible to identify which one of them is in fact the aimed harmonic component to be measured. In an extreme instance, the tuner may erroneously tune the vibration frequency of the vibrating object to a harmonic (n+1)f or (n−1)f which is located just adjacent to the aimed harmonic partial nf. For example, let us consider the instance wherein the tuner intends to tune the vibration frequency of a vibrating object having the fundamental vibration frequency of sound of 22.5 Hz prior to tuning so as to have the fundamental vibration frequency of 27.5 Hz. In order to do this, let us assume that the tuner employs a band-pass filter 2 having the filter characteristic A whose middle point is set at 110 Hz frequency of the quadruple harmonic. Whereupon, a signal of 90 Hz which is the quadruple harmonic of the fundamental frequency 22.5 Hz prior to tuning and a signal of 112.5 Hz which is the quintuple harmonic of this 22.5 Hz harmonic are allowed to pass jointly through the filter owing to the fact that these two frequencies are included in the width of the pass band of this band-pass filter. Accordingly, in each of the tuning operations that the tuner (tuning engineer) turns the tuning pin of, for example, a piano clockwise and counterclockwise, the output signal derived will only increase, and it becomes altogether impossible for the tuner to identify which one of them is the quadruple harmonic sound signal which is aimed. Such phenomenon will be prominent in an instance wherein the fundamental vibration frequency of the vibrating object is departed toward the lower level side than that which is aimed.

Furthermore, in case the vibration frequency of the vibrating object is departed so far as to be on the outside of the pass band of the band-pass filter 2, it is utterly impossible to obtain an output. Moreover, it is impossible also to known in which direction the vibration signal is departed. In case it is intended to adjust the vibration frequency of a string in particular, it often happens that the vibration frequency of the string prior to tuning is founnd to depart considerably from the vibration frequency which is aimed. Thus, the above-discussed problem will take place prominently. Also, in case such conventional measuring system as stated above is relied upon, there may arise instances wherein no output signal is derived. Thus, this known measuring system is not suitable for use as the vibration frequency measuring system of an automatic tuning device which is designed to use a signal which is formed by converting the vibration of the vibrating object to an electric signal to thereby automatically tune the naked vibration frequency into the vibration frequency which is aimed.

Especially, in the treble (high frequency) range, the amount of departure of the vibration frequency becomes great, and therefore the above-discussed known measuring device will be found difficult to operate.

SUMMARY OF THE INVENTION

It is, therefore, a primary object of the present invention to provide a method and an apparatus for measuring, easily and accurately, the fundamental vibration frequency of a vibrating object.

Another object of the present invention is to provide a method and an apparatus of the type described above, whicch is capable of making an easy and yet accurate measurement of the fundamental vibration frequency of any vibrating object ranging from one having a high natural vibration frequency to one having a low vibration frequency.

Still another object of the present invention is to provide an improved method for adjusting the vibration frequency of a vibrating object such as the strings of a piano.

These and other objects of the present invention will become apparent by reading the following detailed description when taken in conjunction with the accompanying drawings.

According to the improved method of the present invention, the vibration frequency of the vibrating object is converted to an electric signal by the use of, for example, a sensor such as a microphone, and from this electric signal of vibration are derived the components of two adjacent harmonic vibration frequencies (partials), and the difference between the frequencies of these two signal components, i.e. a frequency which is equal to the fundamental vibration frequency of the vibrating object, is calculated.

According to an example of the present invention, the vibration of the vibrating object is converted to an electric signal by a sensor, and this electric signal of vibration is then inputted to a voltage-controlled variable band-pass filter. The middle (center) frequency of the pass band of this filter is controlled by a sweeper and is varied successively. As this middle frequency of the filter varies successively, there successively appears a peak in the output of this filter. The two frequencies corresponding to adjacent two peaks are measured successively by a frequency counter. The resulting two measured values (frequencies) corresponding to said two peaks are stored in two memories, respectively. The signals read out from these two memories are applied to calculators, respectively, so that the difference in frequency between these two signals is calculated. The resulting frequency difference thus sought indicates the fundamental vibration frequency of the vibrating object. The middle frequency of said filter need only be such one as can be successively varied within the range covering the harmonic vibration frequencies of the vibrating object to be tuned. Those degrees of adjacent two harmonic vibrations which are derived by these filters may be arbitrary ones. It should be understood, however, that the degrees of the adjacent harmonic vibrations which are derived should be such that their frequency levels are not too small relative to the fundamental vibration frequency.

According to another example of the present invention, the vibration of the vibrating object is converted to an electric signal by the use of a sensor such as a microphone, and it is inputted to a pair of band-pass filters. The middle frequency of the pass band of each of these two filters is arranged to be in agreement with the frequencies of adjacent two harmonics of the vibrating object. Accordingly, the differences in middle frequency between these two filters is equal to fundamental vibration frequency of the vibrating object. The outputs of these two filters are inputted into a multiplier for being multiplied. The output of this multiplier indicates a sum signal component of the two input signals applied thereto (meaning a component representing the sum of the frequencies of the two input signals) and a differential signal component (meaning a component representing the difference in frequency between the two input signals). The frequency of this differential signal component is equal to the frequency of the vibration frequency of the vibrating object. Accordingly, by passing the output of the multiplier through a low-pass filter and by deriving only the differential signal component, there can be obtained the fundamental vibration frequency of the vibrating object from the output of this low-pass filter. For example, in case it is intended to tune a string of a piano, the respective middle frequencies of a pair of band-pass filters are set first at adjacent two higher harmonic vibration frequencies which are to develop after the tuning of said string has been completed. Whereupon, by operating a tuning pin in such a way that the output level of the low-pass filter will become maximum, it is possible to carry out the tuning of this string quite easily.

BRIEF DESCRIPTION OF THE DRAWINGS

FIG. 1 is a block diagram showing a typical example of known system for measuring the vibration frequency of a vibrating object.

FIG. 2 is a chart showing the amplitude levels of the fundamental frequency, and harmonics presented by a vibrating low-pitch string of a piano.

FIG. 3 is an illustration for explaining the action of the known system shown in FIG. 1.

FIG. 4 is a block diagram showing an example of the system for measuring the vibration frequency of a vibrating object according to the present invention.

FIG. 5 is a block diagram showing another example of the system according to the present invention.

DETAILED DESCRIPTION OF THE PREFERRED EMBODIMENTS

An example of the present invention will be described by referring to FIG. 4. Reference numeral 4 represents a sensor for detecting the vibration of a vibrating object not shown and for converting the detected vibration to an electric signal. This sensor 4 may be an ordinary microphone. The output of this sensor 4 is inputted into an amplifier for being amplified, and the resulting amplified output, in turn, is inputted into a voltage-controlled variable bandpass filter 6. The middle frequency of the pass band of this filter 6 is controlled by a sweep 7, and this middle frequency varies successively. This sweeper 7 is one that produces, for example, a sawtooth voltage. The filter 6 outputs several harmonic vibration signals during the sweeping period of said sweeper 7. More specifically, for example, at each time the frequencies of the respective harmonic signals shown in FIG. 2 come into agreement with the middle frequency of the filter 6, there develops a peak amplitude level in the output of this filter 6.

Numeral 9 represents a frequency counter to which the output of the filter 6 is inputted. This frequency counter 9 measures the frequency of the output signal of the filter 6 at each development of peak in the output of this filter 6. More specifically, the frequencies of adjacent two harmonic vibrations of the vibrating object are measured by this frequency counter 9 is triggered by the output of a peak-detector 8 assigned for detecting the peak of the output of the filter 6, and measures the frequency of the output of the filter 6. When this frequency counter 9 is triggered upon its receipt of an output of the peak-detector 8, the frequency counter 9 measures the output of the filter 6, and feeds the result of the measurement to a first memory 12 via a switching circuit 11 for being stored in this first memory 12. A delay circuit 10 delays the action of the peak-detector 8, and after the completion of the storing action of the first memory 12, this delay circuit 10 feeds a changeover signal to the switching circuit 11. Whereupon, the frequency counter 9 is electrically connected to a second memory 13 via the switching circuit 11. It should be understood that, simultaneously with the changeover action of the switching circuit 11, the contents of the frequency counter 9 are cleared. When, thereafter, the peak of the next-produced output of the filter 6 is detected by the peak-detector 8, the frequency counter 9 measures the frequency of this next-produced output of the filter 6, and feeds via the switching circuit 11 the results of the measurement to said second memory 13 to be stored therein. In this way, the frequencies of adjacent two harmonic vibrations of the vibrating object are stored in the first memory 12 and the second memory 13, respectively. When, in this state, the sweeping period of the sweeper 7 terminates and when, accordingly, the sawtooth output thereof undergoes a decay, this decay is differentiated by a differentiater circuit 15, and its differentiation signal is fed to a calculator 14. Upon receipt of this differentiation signal, the calculator 14 calculates the difference in frequency between the adjacent two harmonic vibrations stored in the first and the second memories 12 and 13, and produces an output at its output terminal 16. More specifically, a signal indicating the fundamental vibration frequency of the vibrating object is derived at said output terminal 16. The calculator 14 may be arranged to be operative so that, for example, it multiplies the outputs of the memories 12 and 13, the outputs the lower frequency component among the result of this multiplication. This will become apparent from the description of the example of FIG. 5 which will be made later.

In summary, in the instant example, the harmonic vibration signals of the vibrating object are successively derived by a voltage-controlled variable band-pass filter 6 whose middle frequency of pass band are varied successively; and, among the harmonic vibration signals thus derived, the frequencies of any adjacent two signals are measured; and by seeking the difference in the measured two frequencies, the fundamental vibration frequency of the vibrating object is obtained. Accordingly, the adjacent two harmonic vibrations which are measured for the purpose of seeking the fundamental vibration frequency of the vibrating object can be arbitrarily selected from among the numerous harmonic vibrations. It will be desirable, however, to set the output conditions of the sweeper 7 so that, in case it is intended to measure such a fundamental vibration frequency of, for example, a low-pitch string of a piano as having the spectrum shown in FIG. 2, the fundamental vibration frequency is sought by the use of any adjacent two harmonics among the third to sixth harmonics having large energy levels.

In the description made above, the frequency counter 9, the first and the second memories 12 and 13, and the calculator 14 may be of either a digital type or an analog type.

Next, description will be made on another example of the present invention by referring to FIG. 5.

The vibration of the vibrating object is converted to an electric signal by a sensor 44 such as a microphone. The electric signal is inputted to a pair of band-pass filters 45 and 46, respectively. The middle frequencies of these filters 45 and 46 are set at the frequencies of adjacent two harmonic vibrations of the vibrating object whose fundamental frequency is to be measured. For example, let us assume that the vibrating object consists of a string of a piano whose vibration frequency is to be adjusted to 27.5 Hz. As shown in FIG. 3, let us assume that the middle frequency of one 45 of the pair of filters 45 and 46 is set at 82.5 Hz (third harmonic) and that the middle frequency of the other filter 46 is set at 110 Hz (fourth harmonic). By doing so, it will be understood that if the fundamental vibration frequency of the vibrating object which is intended to be adjusted to 27.5 Hz is noted to depart from this value, only one of the two filters 45 and 46 will produce an output or neither one of these filters will produce an output. The filters 45 and 46 will produce outputs simultaneously only when the fundamental vibration frequency of the piano string is brought into agreement with 27.5 which is the aimed frequency.

The multiplier 47 is assigned to conduct mathematical multiplication of the output signals X and Y of the two filters 45 and 46. The output signal Z of the multiplier 47 is expressed by the following equation:

$$Z = X \cdot Y$$
$$= A_x \cos(2\pi f_x t + \theta_x) \cdot A_y \cos(2\pi f_y t + \theta_y)$$
$$= \tfrac{1}{2} A_x \cdot A_y \{\cos[2\pi(f_x + f_y)t + \theta_x + \theta_y] + \cos[2\pi(f_x - f_y)t + \theta_x - \theta_y]\}$$

wherein:

$A_x$, $A_y$ represent the amplitudes of the signals X and Y;

$f_x$, $f_y$ represent the frequencies of the signals X and Y; and $\theta_x$, $\theta_y$ represent the phases of the signals X and Y.

More specifically, in case the fundamental vibration frequency of the vibration object, i.e. the string of a piano, has been correctly adjusted, the output signal Z of the multiplier 47 contains the sum-up signal components $(f_x + f_y)$ of: the 82.5 Hz frequency $(f_x)$ of the third harmonic and the 110 Hz frequency $(f_y)$ of the fourt harmonic, and also contains the difference signal component $(f_x - f_y)$ of these two frequencies. Accordingly, by passing this output of the multiplier 47 which contains the aforesaid signal components through a low-pass filter 48 to remove the sum-up signal components $(f_x + f_y)$ from the output of the multiplier 47, there will be derived at the output terminal 49 thereof a difference signal component which is a signal having a frequency equal to the fundamental vibration frequency of the piano string.

As discussed above, arrangement is made so that vibration signal of a vibrating object is fed to a multiplier through two filters whose middle frequencies are different from each other by an amount of the fundamental frequency of the vibrating object, and that only a lower frequency component from among the frequencies contained in the output of the multiplier is derived through a low-pass filter. Whereby, it will be understood that, by operating a fundamental vibration frequency adjusting means of the vibrating object, i.e. a tuning means of a piano string, it is possible to surely and easily adjust the fundamental vibration frequency of the vibrating object to the aimed frequency.

In this instant example, arrangement is provided so that the outputs of a pair of filters are multiplied by a multiplier. It should be understood, however, that arrangement may be provided to operate in such a way that the output levels of the two filters are directly observed to adjust the fundamental vibration frequency of the vibrating object.

According to this instant example, arrangement is provided so that, when the fundamental vibration frequency of the vibrating object comes into agreement with the aimed frequency, the output level of the low-pass filter 18 becomes maximum. As such, by the use of a control means constructed so that the vibration frequency adjusting means, i.e. a tuning pin, of a vibrating object, i.e. a piano string, is operated in accordance with the output level of a low-pass filter, it is possible to automatically adjust the fundamental vibration frequency of the vibrating object.

In a similar way, in the example of FIG. 4 also, there may be provided a control unit for operating the vibration frequency adjusting means, e.g. a tuning pin, of a vibrating object, e.g. a piano string, so as to bring the frequency of the output of the calculator 14 into agreement with a reference frequency, whereby it is possible to automatically adjust the frequency of the vibrating object.

As stated above, according to the present invention, the fundamental vibration frequency of a vibrating object is obtained from the difference in frequency between adjacent two harmonic vibrations of a vibrating object. Therefore, even in the event that the fundamental vibration frequency of the vibrating object departs considerably from a reference frequency, it is possible to unmistakingly measure and adjust the fundamental vibration frequency.

I claim:

1. A method for measuring the fundamental frequency of a vibrating object, comprising the steps of:
   a. detecting the vibration of said vibrating object and converting the detected vibration to an electric signal;
   b. deriving harmonic components of said vibrating object from said electric signal;
   c. measuring the frequencies of the derived harmonic components; and
   d. obtaining the difference between those frequencies, among the measured frequencies which correspond to any adjacent two harmonic components among said measured harmonic components,
   in which said step b) is accomplished by passing said electric signal through a variable band-pass filter whose middle frequency of pass band is varied successively; and
   said step c) is accomplished by measuring the frequency of the output of said filter at each time a peak develops in the output of said variable band-pass filter.

2. An apparatus for measuring the fundamental vibration frequency of a vibrating object, comprising:
   sensing means for detecting the vibration of said vibrating object and converting the detected vibration to an electric signal;
   filter means for deriving those harmonic vibration components of said vibrating object contained in said electric signal;
   frequency measuring means for measuring the frequencies of any adjacent two harmonic vibration components present among said harmonic vibration components derived by said filter; and
   means for obtaining the difference in frequency between the adjacent two harmonic vibration components measured by said frequency measuring means,
   in which said filter means is a variable band-pass filter whose middle frequency of pass band is varied successively; and
   said frequency measuring means is one for measuring the frequency of the output of said variable pass-band filter at each development of a peak in the output thereof.

3. An apparatus according to claim 2, in which:
   said frequency measuring means comprises:
   a peak-detector for outputting a signal at each development of a peak in the output of said variable band-pass filter upon receipt of the output of this filter; and
   a frequency counter for measuring the frequency of the output of said variable band-pass filter at each time a signal is outputted from said peak-detector upon receipt of the output from this peak-detector.

4. An apparatus for measuring the fundamental vibration frequency of a vibrating object, comprising:
   a sensor for detecting the vibration of the vibrating object and converting this detected vibration to an electric signal;
   a voltage-controlled variable band-pass filter to which is inputted said electric signal;
   a sweeper for generating a signal causing successive variation of the middle frequency of pass-band of said voltage-controlled variable band-pass filter:
   a peak-detector for outputting a signal at each development of a peak in the output of said voltage-controlled variable band-pass filter;
   a frequency counter for measuring the frequency of the output of said voltage-controlled variable band-pass filter at each receipt of an output signal from said peak-detector;
   a delay circuit for delaying the output of said peak-detector for a period of time required for the measuring action performed by said frequency counter;
   a switching circuit whose connection of conducting passages is changed from one to another upon each receipt of the output of said delay circuit;
   two memories to which the output of said frequency counter is alternately inputted; and
   a calculator for calculating the difference in frequency between any adjacent two harmonic vibrations of said vibrating object from the contents stored in said two memories.

5. A method for adjusting the vibration frequency of a vibrating object, comprising the steps of:
   a. detecting the vibration of said vibrating object and converting the detected vibration to an electric signal;
   b. deriving harmonic vibration components of said vibrating object from said electric signal;
   c. measuring the frequencies of said derived harmonic vibration components;

d. obtaining the difference between the frequencies, among the measured frequencies, corresponding to any adjacent two harmonic vibration components; and
e. operating a means provided for the purpose of varying the vibration frequency of said vibrating object and thereby bringing the difference in frequency obtained into agreement with a predetermined reference frequency.

6. A method for adjusting the vibration frequency of vibrating object, comprising the steps of:
a. detecting the vibration of said vibrating object and converting the detected vibration to an electric signal;
b. inputting said electric signal into two band-pass filters whose respective middle frequencies are set to any adjacent two harmonic vibration frequencies generated by said vibrating object whenever the fundamental vibration frequency of said vibrating object is in agreement with an aimed frequency;
c. inputting the outputs of said two band-pass filters into a multiplier to thereby generate a difference signal consisting of a frequency signal equal to the difference in frequency between the two input signals of said multiplier; and
d. operating a means provided for the purpose of varying the vibration frequency of said vibrating object, to thereby make the level of said difference signal maximum.

* * * * *

UNITED STATES PATENT OFFICE
CERTIFICATE OF CORRECTION

Patent No. 4,041,783                     Dated August 16, 1977

Inventor(s) Minoru SHIMAUCHI and Takashi ONODA

It is certified that error appears in the above-identified patent and that said Letters Patent are hereby corrected as shown below:

Under the Heading:

Item [30]   Foreign Application Priority Data should read:

March 5, 1975   Japan.....50-25885

April 22, 1975 Japan.....50-48146

Signed and Sealed this

*Seventh* Day of *March 1978*

[SEAL]

*Attest:*

RUTH C. MASON  
*Attesting Officer*

LUTRELLE F. PARKER  
*Acting Commissioner of Patents and Trademarks*